(12) United States Patent
Kahmann et al.

(10) Patent No.: US 10,782,268 B2
(45) Date of Patent: Sep. 22, 2020

(54) AUTOMATED ULTRASONIC INSPECTION OF ADHESIVELY-BONDED JOINTS AND INSPECTION METHOD THEREFOR

(71) Applicant: General Electric Company, Schenectady, NY (US)

(72) Inventors: Frank Kahmann, Aachen (DE); Daniel Koers, Hürth (DE); Norbert Ewald Steinhoff, Erftstadt (DE); Weiwei Zhang, Bonn (DE)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 15/893,977

(22) Filed: Feb. 12, 2018

(65) Prior Publication Data

US 2018/0231502 A1 Aug. 16, 2018

Related U.S. Application Data

(60) Provisional application No. 62/458,250, filed on Feb. 13, 2017.

(51) Int. Cl.
*G01N 29/22* (2006.01)
*G01N 29/04* (2006.01)
(Continued)

(52) U.S. Cl.
CPC ......... *G01N 29/225* (2013.01); *G01N 29/041* (2013.01); *G01N 29/043* (2013.01);
(Continued)

(58) Field of Classification Search
CPC .. G01N 29/225; G01N 29/041; G01N 29/043; G01N 29/09; G01N 29/265;
(Continued)

(56) References Cited

U.S. PATENT DOCUMENTS 5,535,843 A * 7/1996 Takeda ..................... B25J 5/007
180/200
2010/0251822 A1 10/2010 Isobe et al.
(Continued)

FOREIGN PATENT DOCUMENTS

JP 2006-153710 A 6/2006
JP 2013-217770 A 10/2013
(Continued)

OTHER PUBLICATIONS

International Search Report and Written Opinion issued in connection with corresponding PCT Application No. PCT/US18/17942 dated Oct. 26, 2018.

*Primary Examiner* — Suman K Nath
(74) *Attorney, Agent, or Firm* — Mintz Levin Cohn Ferris Glovsky and Popeo, P.C.

(57) ABSTRACT

An inspection system for determining the efficacy and veracity of a bond-line, comprising: a robotic arm assembly providing a gimbal mount for enabling linear and rotary translation about multiple axes; an ultrasonic transducer affixed to the gimbal mount of the robotic arm assembly and comprising a planar array of transducer elements, each transducer element capable of transmitting and receiving reflected ultrasonic energy indicative of changes in acoustic impedance within the bond-line. The reflected energy of each transducer element provides acquired bond-line data indicative of the efficacy of the bond-line while select transducer elements produce orientation data indicative of the orientation of the planar array relative to the contour of the bonded joint. The bond-line and orientation data are combined to determine whether the direction of the transmitted pulse should be altered to validate the bond-line data.

18 Claims, 6 Drawing Sheets

(51) Int. Cl.
  *G01N 29/09* (2006.01)
  *G01N 29/265* (2006.01)
  *G01N 29/28* (2006.01)

(52) U.S. Cl.
  CPC ........... *G01N 29/09* (2013.01); *G01N 29/265* (2013.01); *G01N 29/28* (2013.01); *G01N 2291/0231* (2013.01); *G01N 2291/0258* (2013.01); *G01N 2291/0289* (2013.01); *G01N 2291/106* (2013.01); *G01N 2291/263* (2013.01); *G01N 2291/267* (2013.01)

(58) Field of Classification Search
  CPC ........... G01N 29/28; G01N 2291/0231; G01N 2291/0258; G01N 2291/0289; G01N 2291/106; G01N 2291/263; G01N 2291/267
  USPC .................................................... 73/588, 589
  See application file for complete search history.

(56) References Cited

U.S. PATENT DOCUMENTS

2011/0072905 A1* 3/2011 Lam ..................... G01N 29/221
                                                73/622
2016/0320344 A1* 11/2016 Spencer ............... G01N 29/043

FOREIGN PATENT DOCUMENTS

WO    2012/167380 A1    12/2012
WO    2016/164457 A1    10/2016

\* cited by examiner

AUTOMATED ULTRASONIC INSPECTION OF ADHESIVELY-BONDED JOINTS AND INSPECTION METHOD THEREFOR

RELATED APPLICATION

This application is a Non-Provisional Patent Application, and claims the benefit and priority of U.S. Provisional Patent Application No. 62/458,250, filed on Feb. 13, 2017. The entire content and disclosure of such an application are hereby incorporated by reference.

BACKGROUND

The subject matter disclosed herein relates to inspection techniques for adhesively bonded joints.

The automotive industry is increasingly moving away from tack welded and/or line-welded joints in favor of adhesively-bonded joints. Such joints can be highly reliable, less susceptible to corrosion over time, offer improved acoustic performance, and/or can be practiced on a fiscal par with welded joints. While such bonded joints provide certain structural benefits, inspection thereof can be labor intensive and, as such, can mitigate the fiscal benefits derived from adhesive bonding.

Non-destructive testing of bonded joints can produce a lower amount of material scrap and, as such, can optimize the fiscal gains achievable by adhesive bonding. One such non-destructive method employs an ultrasonic inspection probe disposed over a bonded surface to detect anomalies in the underlying bond-line. The ultrasonic inspection probe is pressed against the surface, i.e., manually manipulated, to introduce an acoustic pulse into the structure. The probe can measure the acoustic impedance in the structure (i.e., the speed of sound in the structure) as a function of the material density. Changes in density, from one material to another, or from one medium to another, effect reflections back to the source, i.e., the inspection pad, which may be imaged by a signal processor. Typical deficiencies/anomalies can include voids, discontinuities, and/or differences in density with respect to the cured composite adhesive of the bond-line.

In practice, such probes may not provide a full picture of the bond-line and generally are presented slowly and deliberately, manually against the surface to ensure that the data obtained by the probe is accurate. If an operator suspects that the pad did not properly image an area of the bond-line, i.e., due to the contour of the part which may be affecting the resultant output, he/she may present the pad at a slightly different orientation. This may be done to determine whether the output changes, e.g., improves/degrades the output by (i) skewing the angle of the probe, or (ii) pitching/rolling the pad five (5) or ten (10) degrees from the previous scan. Additionally, rotary encoders can be integrated with the housing of the probe which have the effect of resisting the motion of the probe. That is, such rotary encoders produce friction drag which can further slow the speed of inspection.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are, therefore, not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Differences between otherwise like parts may cause to those parts to be indicated with different numerals. Different parts are indicated with different numerals. Thus, for further understanding of the invention, reference can be made to the following detailed description, read in connection with the drawings in which.

SUMMARY OF THE DISCLOSURE

Figure 1:
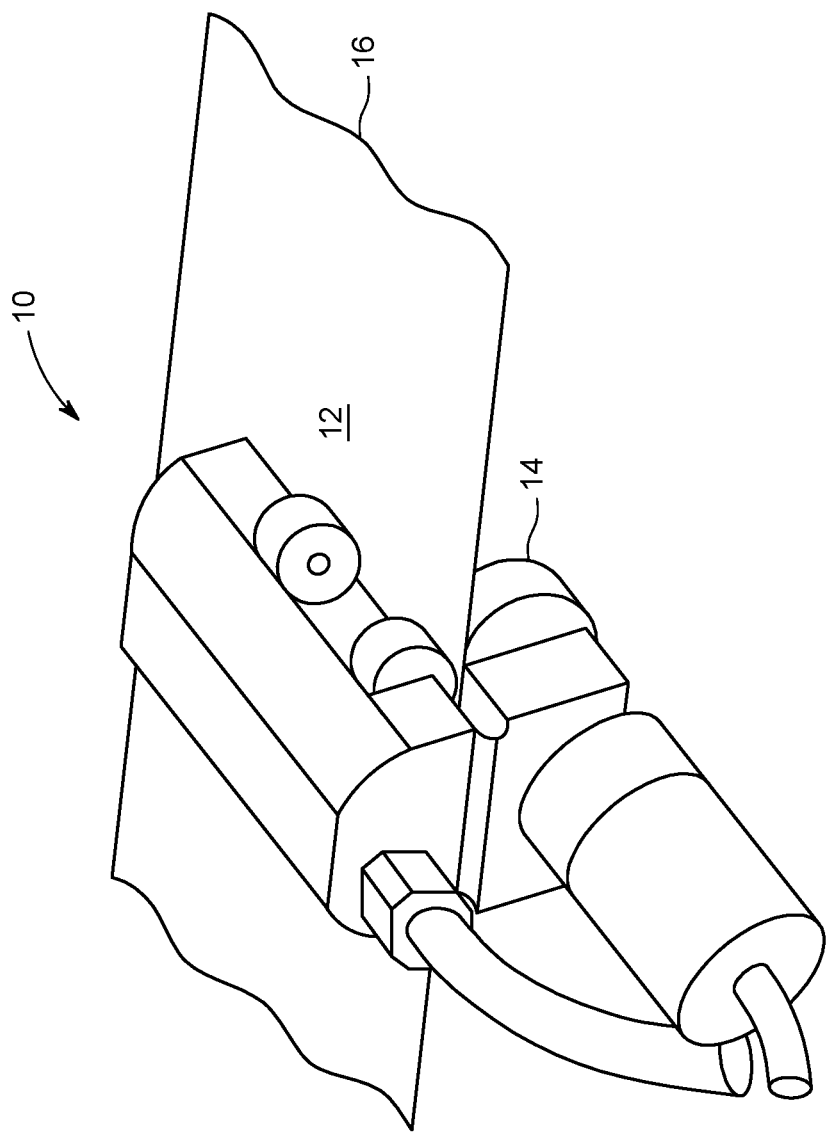
FIG. 1 is an broken-away, perspective view of a flexible ultrasonic pad of the type employed in the teachings of the disclosure, which flexible pad is disposed in a housing which traps a bonded joint between the ultrasonic pad and a path pulse generator.

The subject matter disclosed herein relates to inspection techniques for adhesively bonded joints, and more specifically, to an automated ultrasonic inspection system and method for determining and ensuring the integrity/strength of bonded joints. In light of the current technology, a need, therefore, exists for an inspection probe which produces reliable inspection data of a scanned bond-line, resolves inaccuracies associated with the bond-line data, eliminates the requirement for rotary encoders and rapidly develops/determines a pass/fail criteria for acceptance/rejection of bond-line data.

In one embodiment, an inspection system is provided for determining the efficacy of a bond-line, comprising: a robotic arm assembly capable of linear translation and rotational displacement about multiple axis, a flexible ultrasonic transducer mounted to the robotic arm assembly and having an array of transducer elements, each element configured to transmit and receive ultrasonic energy indicative of the efficacy of the bond-line within the bonded part; and a signal processor, responsive to ultrasonic impedance signals issued by the ultrasonic transducer and to position signals issued by position encoders of the robotic arm assembly. The signal processor is operative to: (i) calculate an amplitude value from each impedance signal, (ii) average the maximum amplitude values associated with each of the transducer elements, (iii) compare the maximum amplitude values to a bond-line threshold, and (iv) determine whether the bond-line threshold is greater than a defect threshold value.

In another embodiment, an inspection system is provided for determining the efficacy and veracity of a bond-line, comprising: a robotic arm assembly providing a gimbal mount for enabling linear and rotary translation about multiple axes; an ultrasonic transducer affixed to the gimbal mount of the robotic arm assembly and comprising a planar array of transducer elements, each transducer element capable of transmitting and receiving reflected ultrasonic energy indicative of changes in acoustic impedance within the bond-line, the reflected energy providing original bond-line data indicative of the efficacy of the bond-line; and select transducer elements additionally transmitting and receiving ultrasonic energy for producing orientation data indicative of the orientation of the planar array relative to the contour of the bonded joint. The bond-line and orientation data are processed to determine whether additional bond-line data ought to be collected and analyzed to determine the veracity of the original bond-line data.

DETAILED DESCRIPTION

An exemplary embodiment of the disclosure describes an ultrasonic inspection system for determining the efficacy of a bond-line for joining structural components. The ultrasonic inspection system is described in the context of a three-dimensional robotic arm assembly capable of linear and rotary motion about multiple axes of the robotic arm assembly. The robotic arm assembly is operative to displace an ultrasonic inspection probe over the bond-line of the structural components.

An inspection probe having a linear array of ultrasonic elements is described, however, it will be appreciated that other inspection probe assemblies may be employed within the spirit and scope of the appended claims. Commonly-owned, co-pending, U.S. patent application Ser. No. 15/068169 entitled "Ultrasonic Inspection Probe Assembly" describes a flexible ultrasonic transducer located between a backing block and a face layer. The flexible ultrasonic transducer array is located in an opening of a compliant frame which flexes to fit the shape of a curved or contoured surface during inspection. After inspection, both the transducer and frame retain their original shape.

FIG. 1 depicts an inspection probe assembly 10 of the type described in the preceding paragraph. The inspection probe assembly 10 includes a flexible array of ultrasonic transducer elements which conform to geometric changes in contour within prescribed limits. In the described embodiment, the flexible array conforms to relatively small variations in contour, i.e., relatively shallow angles. The inspection probe assembly 10 shown in FIG. 1 is manually manipulated over the surface of a bonded part 12 and includes a path pulse generator 14 for measuring the location of the inspection probe assembly 10 along the surface 16 of the bonded part 12. Operationally, the ultrasonic transducer array transmits ultrasonic energy into the bond-line (not shown in FIG. 1) and receives/records reflected ultrasonic energy indicative of changes in acoustic impedance within the bond-line.

As mentioned in the background, manual manipulation of such inspection probe assemblies 10, in some cases especially those which employ rotary encoders 14 for position acquisition, can slow the process of data acquisition. As such, the use of such inspection probe assembly 10 can be impractical for high volume production such as may be required in the automobile industry. Notwithstanding such drawbacks and/or deficiencies, such manually-manipulated inspection probe assembly 10 can offer the advantage of being able to immediately and instantaneously, or close thereto, collect additional inspection data which either validates or corrects the original bond-line data. That is, by further manual manipulation, the planar array of ultrasonic elements may be oriented at a slightly different angle or orientation such that the bond-line data may be seen from a slightly different vantage point or angle. This vantage point may validate or correct the efficacy of the bond-line such that it may now be deemed acceptable for passing certain predetermined bond-line criteria, i.e., eliminating the number of rejected parts and the expense associated therewith.

As will be discussed in greater detail hereinafter, the disclosure can employ algorithms which enable the flexible transducer to be manipulated by a robotic arm assembly which may not have the intrinsic or inherent "feel" such as that provided by a hand-held or manually operated transducer pads. More specifically, the algorithms employed by the present disclosure enables the flexible transducer to be manipulated by a high rate of production robotic arm assembly/machine while, at the same time, providing the dexterity and feel attainable by manually manipulated inspection probe assemblies 10.

Figure 2:
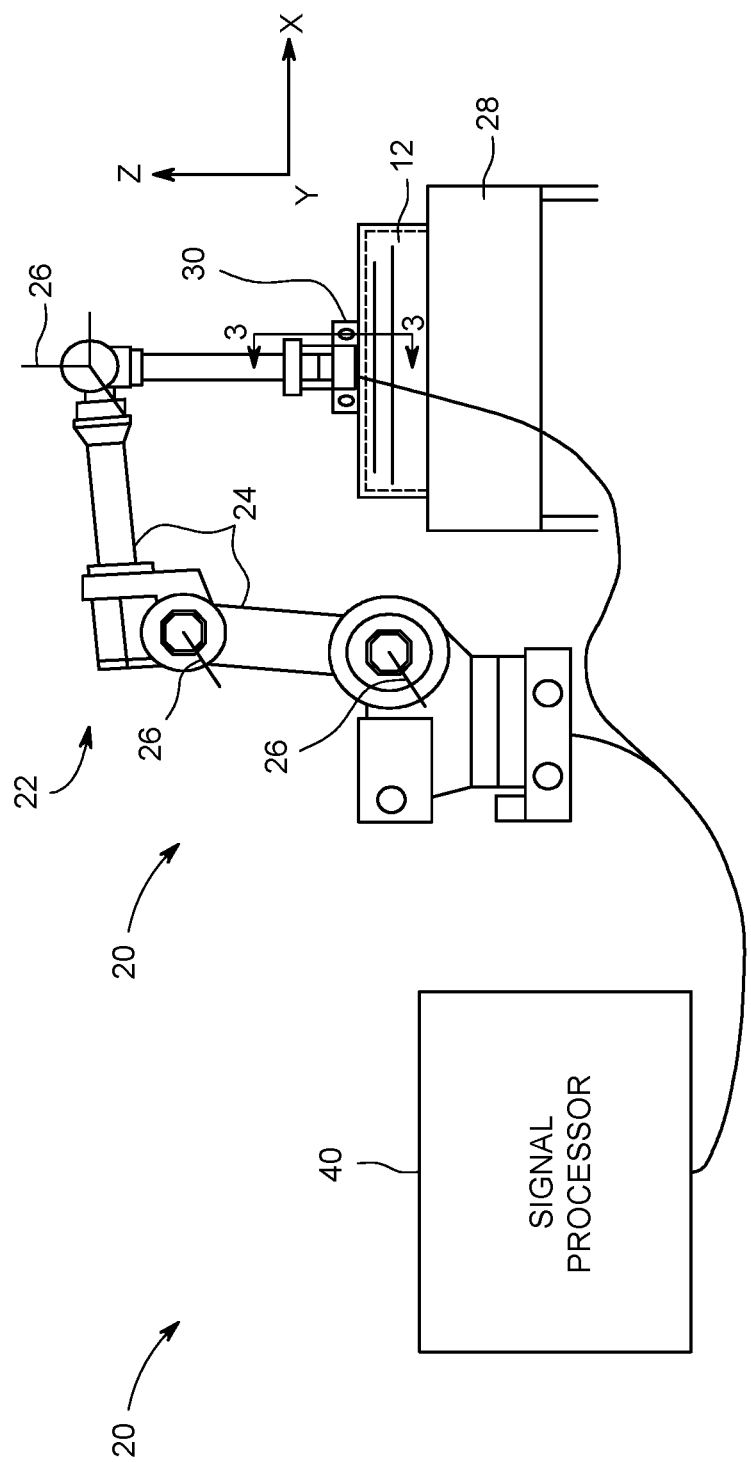
FIG. 2 is a schematic of a robotic inspection system in accordance with the teachings of the present disclosure wherein a robotic arm assembly provides a gimbal mount for supporting a flexible ultrasonic transducer operative to inspect the bond-line of a bonded part.

In FIG. 2, the ultrasonic inspection assembly 20 includes a robotic arm assembly 22, a flexible ultrasonic transducer or transducer array 30 gimbal mounted to the robotic arm assembly 22, and a signal processor 40, responsive to position signals to control the position of the robotic arm assembly 24 and to ultrasonic impedance signals issued by the ultrasonic transducer 30, to record/compare/contrast acquired bond-line data to stored values of a predetermined, bond-line threshold such that defect values may be issued which are indicative of an accepted or rejected component bond-line (the bond-line threshold and defect values associated with the difference between the bond-line threshold and the acquired bond-line data will be discussed in greater detail below).

Figure 3:
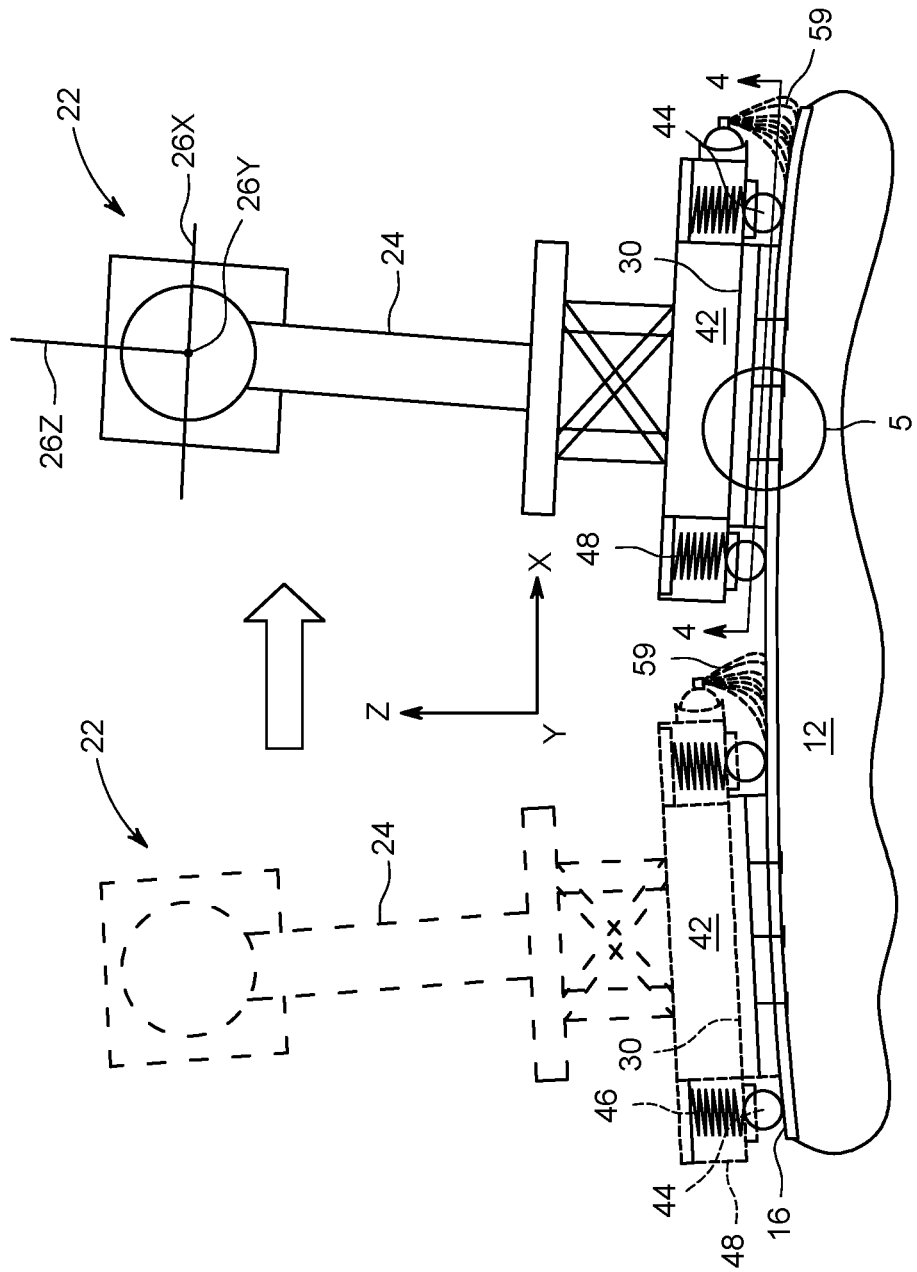
FIG. 3 depicts schematic views of the robotic inspection system taken substantially along line 3-3 of FIG. 2 showing the robotic arm assembly and the flexible ultrasonic transducer in two positions along the contoured surface/edge of the bonded part.

In FIGS. 2 and 3, the robotic arm assembly 22 may include a variety of linear and rotary actuators and transducers operative to effect displacement of the robotic arm assembly 22 about multiple axes 26. The linear and rotary actuators include position encoders to provide position feedback to the controller or signal processor 40 relative to a mounting table 28, and to the bonded part 12 which is affixed to the mounting table 28. That is, since the position of the robotic arm assembly 22 can be known in three dimensional space, i.e., by a laser alignment or a theodolite 3-D positioning system, the position of the ultrasonic transducer 30, which is gimbal mounted to the robotic arm assembly 22, can also known relative to the bonded part 12 and to the underlying bond-line thereof.

Figure 4:
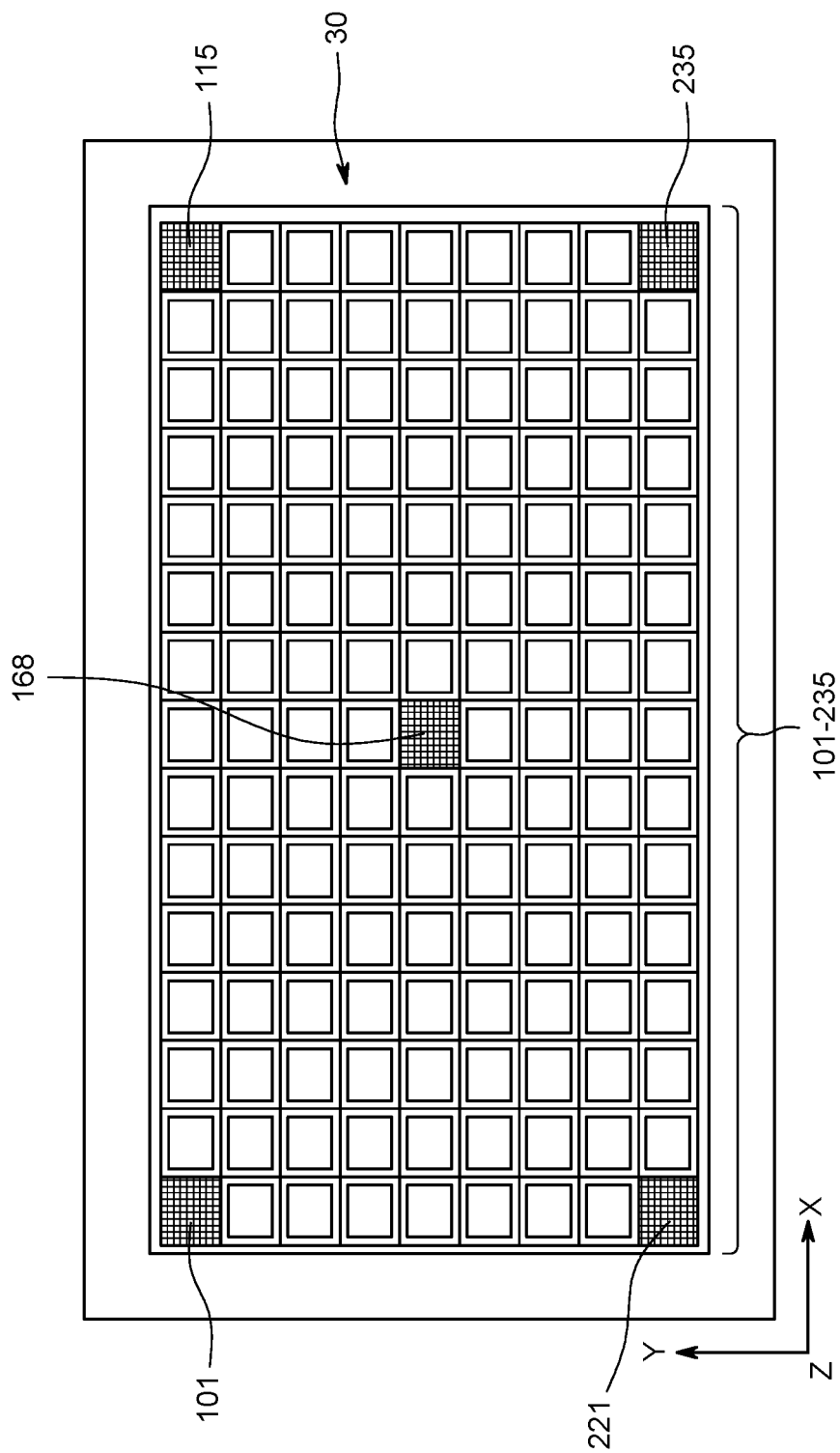
FIG. 4 depicts the underside surface of the flexible ultrasonic transducer taken substantially along line 4-4 of FIG. 3, which ultrasonic transducer is segmented into a plurality of finite transducer elements for the purpose of: (i) performing inspection subroutines dedicated to evaluation of the bond-line, and (ii) determining contour variations of the bond-line.

In FIGS. 3 and 4, the ultrasonic transducer 30 is gimbal mounted to the robotic arm assembly 22, positioned over the bond-line, and displaced along the bond-line to acquire bond-line data. In the described embodiment, the ultrasonic transducer 30 is mounted within a rectangular housing 42 having a plurality to spring-biased, spherical rolling elements 44 disposed at each of the four-corners of the rectangular housing 42. The rolling elements 44 ensure that that the transducer 30 and the housing 42 slide without resistance across the surface 16 of the bonded part 12. In the described embodiment, the housing 42 includes a bore hole 46 at each corner thereof, which bore hole has an axis transverse to the direction of translational motion of the housing 42. Each bore hole 46 receives a coil spring 48 for biasing a spherical ball 44 against the surface 16 of the bonded part 12.

Figure 5:
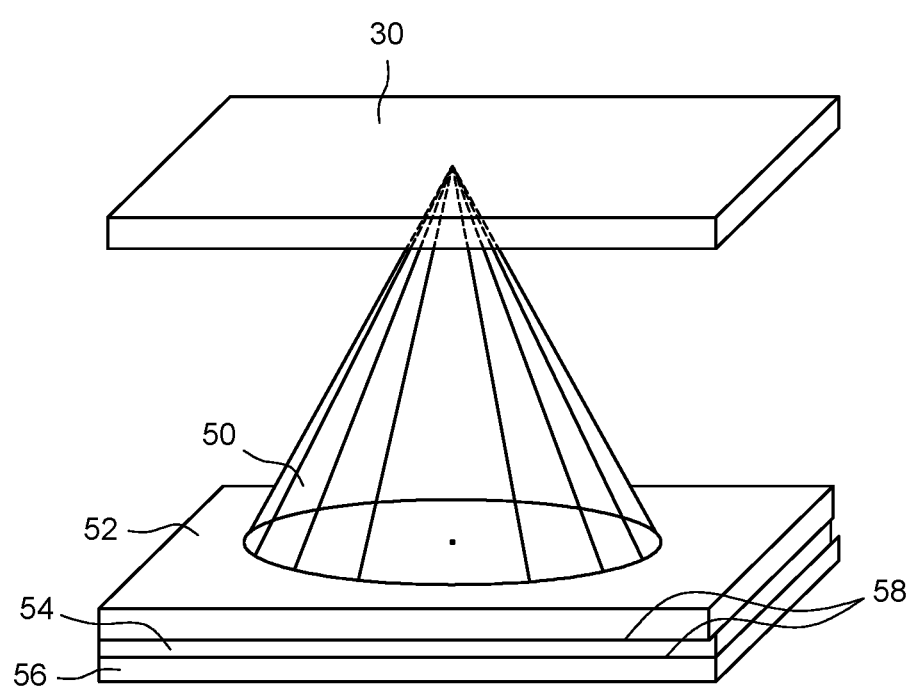
FIG. 5 depicts an enlarged view of the bond-line for joining the components or layers of the bonded part and a cone of pulsed ultrasonic energy transmitted by a single transducer element.

In FIGS. 3, 4 and 5, the ultrasonic transducer 30 includes an array of transducer elements 101-235 (FIG. 4) to inspect the bond-line by transmitting an ultrasonic pulse 50 of high frequency RF energy through the bond-line 54. The pulses 50 issued by each of the transducer elements 101-235 travel through the layers 52, 54, 56 of the bonded part 12 which may include a first layer 52 of sheet metal bonded to a second layer 56 of sheet metal by a bond-line 54 of thermoplastic/thermoset epoxy resin. Any change in density or reflective index, effecting a change in the speed of sound, i.e., also known as the acoustic impedance of the material, traveling through the layers 52, 54, 56, produces an echo, or reflection, at the interface 58 of the materials 52, 54, 56.

To ensure that transducer elements 101-235 of the ultrasonic transducer 30 are intimately in contact with the surface 16 of the bonded part 12, it may be necessary to inject or spray a fluid conductive medium 59 therebetween. The conductive medium 59 ensures that the ultrasonic waves of the transducer 30 transmit directly into the surface 16 of the bonded part 12. The conductive medium 59 may comprise various combinations of propylene glycol, glycerine, phenoxyethanol, carbapol R 940 polymer and water.

The reflected pulse is best heard/calculated when the reflection is orthogonal to an interface. However, inasmuch as the plane of the transducer elements 101-235 may vary relative to the plane of the surface 16, i.e., due to contour variations of the surface 16, the transducer elements 101-235 may not be receiving an optimum return.

In FIGS. 4 and 5, the disclosure provides information concerning the orientation of the ultrasonic transducer array 30 which may affect the efficacy of the return by using select transducer elements. That is, select transducer elements around the periphery of the array, e.g., elements 101, 115, 221, and 235, and at the center of the array, e.g., element 168, may be used to calculate the distance that each such element 101, 115, 168, 221, and 235 is separated from the surface 16. These transducer elements 101, 115, 168, 221, and 235 may pulse and receive a surface return, to determine a distance dimension from the surface 16. By calculating the distance that each element 101, 115, 168, 221, and 235 is from the surface, the angular orientation of the transducer 30 relative to the surface 16 can be calculated. If it is determined that a better return may be obtained by conically pulsing the elements, i.e., at a cone angle of about +/−5 degrees, then a forward or aft pulse or "shot" 50 may be taken by the other elements 101-114, 116-167, 169-219, and 221-234. While the direction of the pulse 50 may be performed electronically, it will also be appreciated that the "shot" 50 may be achieved by pitching the transducer 30 forward/aft, or rolling the transducer 30 to one side or to the other by the gimbal mount of the robotic arm assembly 22. Whether the pulse or "shot" 50 is performed electronically or physically, such action can be taken to obtain a better return or picture, similar to the way that an operator manipulates the hand-held probe 10 shown in FIG. 1. Consequently, by using some of the elements 101, 115, 168, 221, and 235 to obtain orientation data and other elements 101-114, 116-167, 169-219, and 221-234 to obtain bond-line data, a more complete or optimum picture of the bond-line is obtained.

Figure 6:
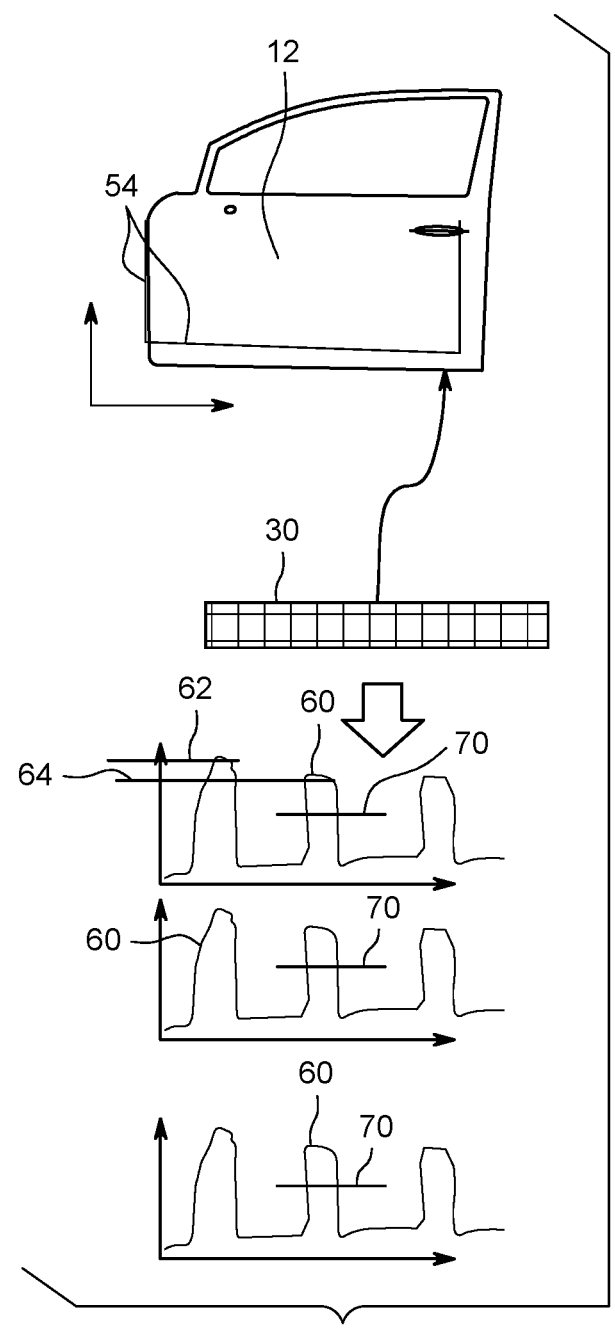
FIG. 6 is a schematic illustration of an acceptance criterion used for determining the efficacy of a bond-line for joining the components of a bonded part.

In operation, the signal processor 40 is responsive to the position signals of the robotic arm assembly 22 and the ultrasonic impedance signals of the flexible ultrasonic transducer 30. More specifically, and referring to FIGS. 5 and 6, each transducer element 30 transmits a pulse 50 (FIG. 5) and receives an impedance or return signal 60. The signal processor 40 is operative to: (i) determine an amplitude value for each of the impedance signals 60 returned to each of the transducer elements 101-235, (ii) sum/scale the maximum amplitude values 62, 64 returned to each of the transducer elements 101-235, (iii) compare the actual amplitude values 62, 64 to a bond-line threshold 70 and issuing a difference signal indicative thereof, and/or (iv) determine whether the bond-difference signal is greater than a defect threshold.

These relationships are expressed below in equations (1.0) and (2.0). With respect to step (i), the amplitude value is obtained from the acoustic impedance signals 60 returned to each of the transducer elements 101-235. In step (ii), the maximum amplitude values 62, 64 are summed/scaled by multiplying each by a normalizing factor between the start times t1, t2 to obtain an image value pursuant to equation (1.0) below.

$$\text{Image}(X, Y) = \text{Summation/Scaling the Max Amplitude} \quad (1.0)$$
$$\text{Values of the Scanned Elements Between Times } T = 1 \text{ and } T = 2 \times \text{Normalization Factor}$$

Next, if the summation of the values returned by the Image (x.y) is greater than a bond threshold 70, i.e., a predetermined threshold established by the specific bonded component, and, if this bond-line threshold 70 exceeds a defect threshold, i.e., another empirically established threshold based on other parameters such as the strength required by the bond-line, then the bond-line criteria is met and the part is accepted (see equation (2.0) below.)

$$\text{If } \frac{\text{Sum of Image}(x, y)\text{values} > \text{Bond Threshold}}{\text{Reference Area}} > \text{Defect Threshold} \quad (2.0)$$

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An inspection system for determining the efficacy of a bond-line of a bonded part, comprising:
   a robotic arm assembly having a plurality of linear and rotary actuators configured to effect linear translation and rotational displacement of the robotic arm assembly about multiple axes, the robotic arm assembly including position encoders issuing position signals indicative of the instantaneous or almost instantaneous position of the robotic arm assembly;

a flexible ultrasonic transducer mounted to a housing of the robotic arm assembly, the ultrasonic transducer having an array of inspection elements, each element configured to transmit and receive ultrasonic energy indicative of the efficacy of the bond-line and issuing an ultrasonic impedance signal indicative thereof; and a signal processor, responsive to the position signals of the robotic arm assembly and the ultrasonic impedance signals of the flexible ultrasonic transducer, to determine whether the efficacy of the bond-line is within a predetermined acceptance threshold;

wherein the ultrasonic transducer includes a plurality of transducer elements, and wherein the flexible ultrasonic transducer is mounted within a housing of the robotic arm assembly and includes at least one bore hole laterally offset from the flexible ultrasonic transducer and having an axis transverse to the direction of translational motion of the housing, the bore hole holding a coil spring for biasing a spherical ball against a surface of the bonded part.

2. The inspection system of claim 1 wherein the signal processor is configured to: (i) calculate a maximum amplitude value associated with each impedance signal, (ii) scale the maximum amplitude values associated with the impedance signal, (iii) determine whether the ratio of the amplitude values is greater than a defect threshold.

3. The inspection system of claim 1 further comprising a fluid dispenser configured to dispense a conductive fluid medium having a known acoustic impedance value between a surface of the bonded part and each of the transducer elements of the flexible ultrasonic transducer.

4. The inspection system of claim 1 wherein the signal processor calculates contour changes associated with the bonded part using select transducer elements of the flexible ultrasonic transducer to view the bond-line from a different vantage point.

5. The inspection system of claim 4 wherein the select transducer elements are disposed along a periphery of the flexible ultrasonic transducer.

6. The inspection system of claim 5 wherein the select transducer elements include one transducer element at the center of the transducer array and other transducer elements disposed along the periphery of the flexible ultrasonic transducer.

7. The inspection system of claim 2 wherein the signal processor compares the maximum amplitude value of each transducer element to a bond-line threshold, and determines whether the ratio of the amplitude values is greater than a defect threshold.

8. An inspection system for determining the efficacy of a bond-line within a bonded part, comprising:

a robotic arm assembly having a gimbal mount for enabling linear and rotary translation about multiple axes;

an ultrasonic transducer affixed to a housing mounted to the robotic arm assembly and comprising a planar array of transducer elements, each transducer element configured to acquire acoustic impedance data indicative of the efficacy of the bond-line and issue acoustic impedance signals indicative thereof;

the planar array of transducer elements including select transducer elements for developing orientation data of the ultrasonic transducer relative a surface of the bonded part; and a signal processor, responsive to the acoustic impedance signals, to determine whether the bond-line is within a predetermined threshold, and responsive to orientation data from the select transducer elements to calculate a contour of the surface for modifying the bond-line threshold;

wherein the housing includes bore holes laterally offset from the flexible ultrasonic transducer, each of the boreholes having an axis transverse to the direction of translational motion of the housing, and holding a coil spring for biasing a spherical ball against the bonded part to facilitate movement of the housing along a surface of the bonded part.

9. The inspection system of claim 8 further comprising a fluid dispenser configured to dispense a conductive fluid medium having a known acoustic impedance value between a surface of the bonded part and each of the transducer elements of the ultrasonic transducer.

10. The inspection system of claim 8 wherein the select transducer elements are disposed along a periphery of the ultrasonic transducer.

11. The inspection system of claim 10 wherein the select transducer elements include one transducer element at the center of the transducer array and other transducer elements disposed along a periphery of the ultrasonic transducer.

12. The inspection system of claim 8 wherein the transducer elements transmit ultrasonic energy in various directions to acquire impedance signals from a variety of angles.

13. The inspection system of claim 8 wherein the signal processor determines whether the bond-line is acceptable in real-time.

14. A method for inspecting a bond-line of a bonded part, comprising the steps of:

configuring a robotic arm assembly to gimbal mount an ultrasonic transducer to effect linear and rotary translation about multiple axes, the ultrasonic transducer comprising a planar array of multiple transducer elements, wherein the ultrasonic transducer is mounted within a housing of the robotic arm assembly and includes at least one bore hole laterally offset from the flexible ultrasonic transducer and having an axis transverse to the direction of translational motion of the housing, the bore hole holding a coil spring for biasing a spherical ball against a surface of the bonded part;

measuring changes in acoustic impedance within the bond-line by transmitting/receiving reflected ultrasonic energy through the bond-line, the ultrasonic energy indicative of the efficacy of the bond-line;

measuring changes in acoustic impedance received by select transducer elements of the ultrasonic transducer, the select transducer elements developing orientation data of the ultrasonic transducer relative to a surface of the bonded part; and using the orientation data collected by the select transducer elements and contour data of the bond-line to determine whether additional bond-line data should be collected to validate the efficacy of the bond-line.

15. The method of claim 14 wherein the step of using the orientation data of the ultrasonic transducer includes the step of comparing the acoustic impedance with the acceptance thresholds associated with each of the select transducer elements.

16. The method of claim 14 further comprising the steps of (i) calculate a maximum amplitude value associated with each impedance signal, (ii) scale the maximum amplitude values associated with the impedance signal, (iii) determine whether the ratio of the amplitude values is greater than a defect threshold.

17. The method of claim 14 further comprising the steps of dispensing a conductive fluid medium between a surface of the bonded part and each of the transducer elements of the ultrasonic transducer.

18. The method of claim 17 wherein the conductive fluid medium has a known acoustic impedance value.

* * * * *